April 1, 1958 G. W. KAMMAN 2,828,836
SHOCK ABSORBER
Filed Aug. 29, 1955 2 Sheets-Sheet 1

Inventor
GORDON W. KAMMAN
by [signature] Attys.

April 1, 1958     G. W. KAMMAN     2,828,836
SHOCK ABSORBER
Filed Aug. 29, 1955     2 Sheets-Sheet 2
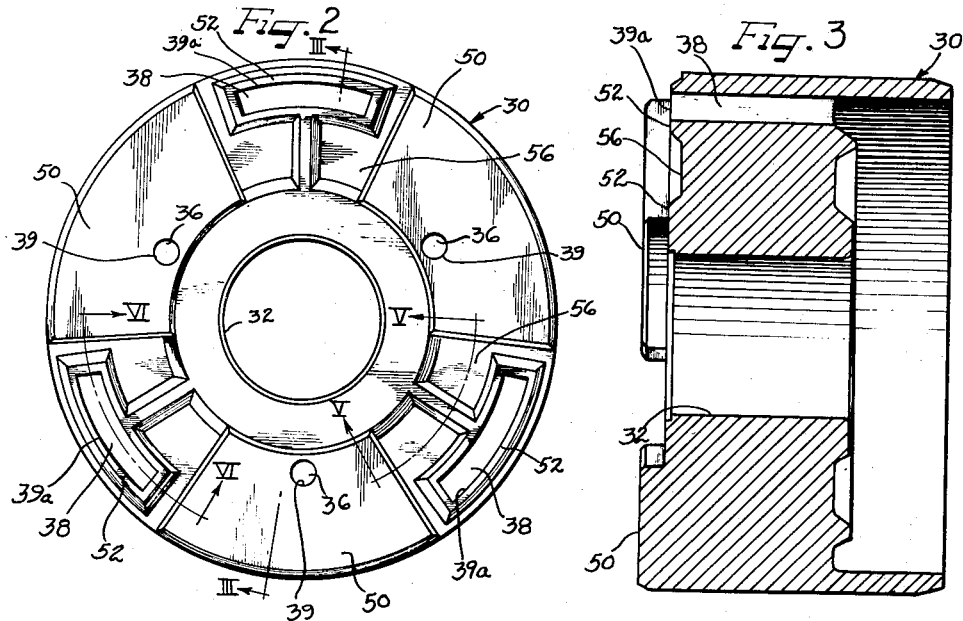
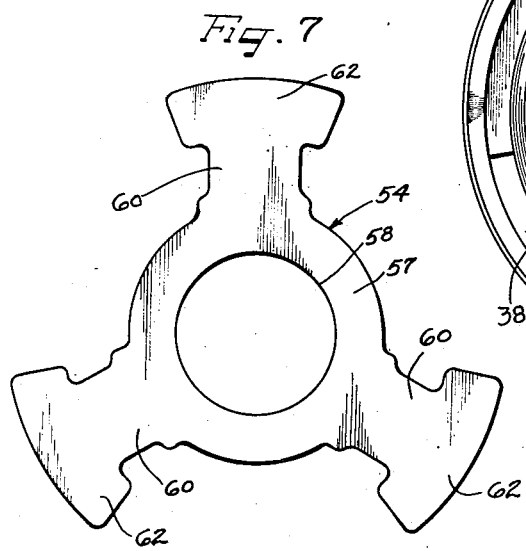
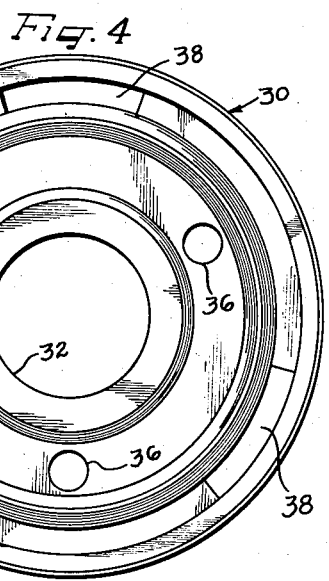
Inventor
GORDON W. KAMMAN

United States Patent Office 2,828,836
Patented Apr. 1, 1958

2,828,836

SHOCK ABSORBER

Gordon W. Kamman, Buffalo, N. Y., assignor to Houdaille Industries, Inc., Buffalo, N. Y., a corporation of Michigan Application August 29, 1955, Serial No. 531,140

10 Claims. (Cl. 188—88)

This invention relates to telescopic shock absorbers, with primary application to shock absorbers adapted to be carried between suspended and unsuspended parts of a vehicle such as an automobile.

It is an object of the present invention to provide a new and improved piston structure for a shock absorber, which will be of a simplified and economical construction yet effective in its operation.

Another object of the present invention is the provision of novel means for shielding and protecting the parts carried by the piston which are associated with the controlled flow of operating fluid through the piston which effectuates its motion-snubbing characteristics.

A further object of my invention is to effect a reduction in the number of parts heretofore deemed necessary to adequately guard and shield those parts associated with such controlled fluid-flow through the piston.

These and other objects, features, and advantages of the present invention will be readily apparent from the following description of a preferred embodiment thereof, taken in conjunction with the accompanying drawings, in which:

Figure 2 is a top plan view of the piston thereof;

Figure 3 is a longitudinal sectional view through the piston shown in Figure 2, and taken generally along the line III—III of Figure 2;

Figure 4 is a bottom plan view of the piston shown in Figure 2;

Figure 7 is a plan view of a valve disk shown in Figure 1.

Figure 1:
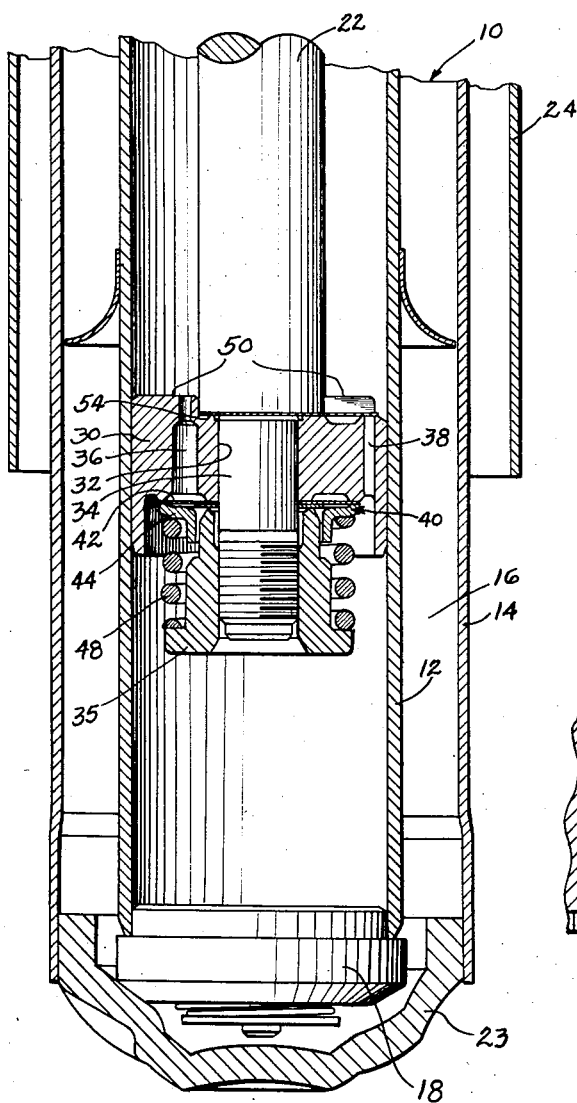
Figure 1 is a longitudinal sectional view of the lower portion of a telescopic shock absorber embodying the piston construction of the present invention.
Figure 5:
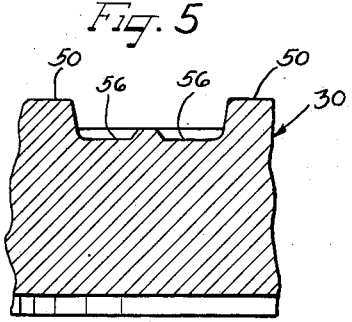
Figures 5 and 6 are detail sectional views of the piston shown in Figure 2, and taken generally along the lines V—V and VI—VI, respectively, of Figure 2.
Figure 6:
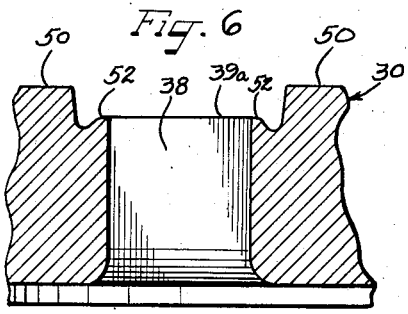

Except for the novel piston construction to which the present application is primarily directed, the shock absorber 10 illustrated is of a known design and appearance. It includes a tubular member 12, which forms the pressure cylinder of the shock absorber, surrounded by a second tubular member 14. The annular chamber 16 between tubular members 12 and 14 provides a reserve chamber or reservoir for the operating fluid of the shock absorber, and the reservoir chamber 16 communicates with the pressure cylinder within the tube 12 by means of a base valve assembly 18 carried at the bottom of the tubular member 12 and adapted to permit flow therethrough to compensate for effective volume changes in the tube 14 occasioned by changes in the displacement effected by a piston rod 22 as it reciprocates during operation of the shock absorber, as will be described later. An end cap 23 closes off the bottom of the outer tubular member 14 about the base valve assembly. The piston rod 22 is provided to extend upwardly out of the end of the tubular member 12, through suitable seal means (not shown) through which rod 22 is slidably received. Desirable seal means are the end cap and bearing shown and described in U. S. Patent No. 2,653,683, issued September 29, 1953 to John N. Strauss. The upper end of the piston rod is adapted by attaching means (not shown) to be secured to a part of the associated vehicle, and the piston rod 22 carries a depending shroud 24 which serves as a shield for the tube 14. Suitable attaching means (not shown) are similarly provided for attaching the end cap 23 to another part of the associated vehicle, so that the piston rod 22 and shroud 24 are axially movable with respect to the tubes 12 and 14.

The present invention concerns a new and improved piston construction for a piston 30 carried by the piston rod 22. More specifically, it is with the construction featured at the upper end of the piston 30 with which the present invention primarily deals.

The piston 30 is desirably compacted from powdered material such as powdered iron. It is provided with a central bore 32 and slipped over a reduced-diameter rod-end portion 34 of the piston rod 22, the piston 30 being held on the rod portion by a nut 35 threaded onto the lower end of the piston rod 22. The piston 30 is provided with an inner series 36 and an outer series 38 of longitudinally extending passageways communicating through openings or ports 39 and 39a, respectively, through which the operating liquid is adapted to pass during the rebound or extension stroke and the compression stroke, respectively, of the shock absorber. It will be observed that the passageways 36 are of smaller individual and aggregate cross-sectional flow area than the passageways 38 which are of relatively much greater individual and aggregate cross-sectional flow area and are preferably of substantially greater width than depth, that is, their largest cross-sectional dimension is in the circumferential angular direction relative to the piston. Openings 39 and 39a, respectively, are provided in the upper surface of piston 30 to communicate passageways 36 and 38 with chamber 12 above the piston. The respective series of passageways 36, 38 are angularly staggered.

The rebound or extension stroke of the shock absorber is snubbed or buffed by valve structure 40 operating to control fluid passage through the inner series of fluid passageways 36. The valve structure 40 includes a valve disk 42, pressure ring 44, nut 35 threaded onto the piston rod-end 34, and a coil spring 48 extending between the pressure ring 44 and the nut 35, all adapted and arranged to permit pressure of the operating fluid to act on the valve disk 42 to force a retraction thereof against the bias of spring 48 and permit a metered flow of operating fluid through openings 36 past the retracted valve disk 42 to the lower side of the piston 30.

In accordance with the present invention, the piston 30 is formed to provide on its upper surface bosses or raised portions 50 which extend above the surface of the piston 30 adjacent the passageway openings 39a and centrally defining a recess within which the shoulder of the full diameter portion of the rod 22 at juncture with the reduced diameter portion 34 is received. That surface adjacent openings 39a is flattened to form a valve seat 52 about each one of those openings, the valve seats 52 all being desirably co-planar with respect to each other and to the central area within the recess toward which the piston rod shoulder is directed. The raised portions 50 serve as buffers or abutments adapted to engage suitable limit means or abutment means carried by the cylinder, at a position of full extension of the piston rod 22, to protect the valve seats 52 and their overlying valve member 54 now to be described. Such limit means desirably comprise the end cap and bearing described in the Strauss patent identified above. It should be noted here that the surface 56 of piston 30 adjacent the valve seats 52 is relieved or recessed to assure that the valve member 54 may seat on the valve seat surfaces 52 and that such valve seat surfaces provide narrow raised bordering ridges or lands defining the ports 39a, with the substantial recessed surface portions about all sides of said lands facilitating free fluid flow.

In the illustrated embodiment, the valve member 54 is the spider-shaped plate or disk shown best in Figure 7. It is desirably provided from flexible and resilient sheet stock such as flapper valve steel. It has a central ring-like portion 57 provided with a central opening 58 which receives the piston-rod end-portion 34. Extending outwardly from the ring-portion 56 are arms or leaves such as the radial fin-like portions 60 each of which emerges into a tab or ear-like portion 62, and those ear-like portions 62 are the valve means which seat on the valve-seats 52 of passageways 38. The fin portions 60 of disk 54 are sufficiently narrow to accommodate the desired flexure of the disk 54 to permit the ears 62 to raise off the valve seats 52 during the compression stroke of piston 30 to permit the operating liquid to pass through the openings 38 into that part of the pressure cylinder 12 above the piston. During the rebound or extension stroke of the piston rod 22, however, the ears 62 seat against the valve seats 52 to check any flow through passageways 38 and force flow of the operating liquid through the inner passageways 36 where it is metered by the valve structure 40 to snub rebound of the shock absorber. By having respective underlying narrow radial land or rib portions connecting and in a common plane with the valve seats 52 and the central rod receiving recess surface and valve disk seat, buckling of the arms 60 and thereby possible distortion of the ears 62 from their seats during pressure fluid force thereagainst in the rebound stroke of the piston is avoided.

It will thus be seen from the foregoing description of my invention according to a preferred embodiment, considered in conjunction with the accompanying drawings, that the present invention provides a new and improved piston construction for a shock absorber, having the desired advantages and characteristics, and accomplishing its intended objects, including those hereinbefore pointed out and others which are inherent in the invention as described. The economy effected by the present construction is of a particular advantage in the commercial field of automotive parts and components, such as is here involved. By the economical and simplified construction according to the present invention, I have eliminated the need of an auxiliary spring to bias a valve disk into valve-closing position, and of a so-called "pick-up washer" and a "spacer-washer," either separately or integral, to properly bottom the spring to cause it to effectuate its bias of the valve disk and to protect the valve disk and valve seats when the piston rod 22 is fully extended; thereby permitting a substantial savings in manufacturing and assembly costs over prior constructions.

It will be understood that modifications and variations may be effected without departing from the scope of the novel concepts of the present invention.

I claim as my invention:

1. A telescopic shock absorber, comprising a cylinder, a shouldered piston rod and a piston mounted thereon axially movable in said cylinder, said piston being provided with a series of angularly spaced passageways extending through said piston for providing flow of operating fluid from one side of said piston to the other, a disk-like valve member carried between the piston and the shoulder of said rod and providing ear-like valve means adapted to seat against said piston to cover the openings into said passageways, said valve means being carried by generally radially extending arms of said valve-member, said piston being provided with integrally offset means extending between said arms and adapted to serve as abutment stop structure limiting movement of said piston in said cylinder in the direction of projection of said offset means.

2. A telescopic shock absorber, comprising a cylinder, a piston rod and a piston mounted thereon axially movable in said cylinder, said piston being provided with a series of angularly spaced passageways extending through said piston for providing flow of operating fluid from one side of said piston to the other, a valve plate operatively secured to said piston and having generally radially extending arms terminating in valve-portions adapted to close said passageways, said piston being provided with projecting angularly spaced boss means to shield said valve-plate and extending beyond said valve plate between said arms and adapted to abut stop means adjacent one end of the cylinder.

3. A telescopic shock absorber, comprising a cylinder, a piston rod and a piston mounted thereon axially movable in said cylinder, said piston being provided with a series of angularly spaced passageways extending through said piston for providing flow of operating fluid from one side of said piston to the other, a sheet-metal spider providing means for covering said piston to control flow of operating fluid through said passageways, the piston being provided with integral portions extending through recesses of said spider and adapted to engage associated limit means carried by the cylinder to shield said spider and limit movement of said rod and piston in said cylinder in the direction of extension of said portions.

4. In a telescopic shock absorber having a piston reciprocable within a cylinder to effect a compression stroke and a rebound stroke and having passageway means in the piston opening to the upper end of the piston for permitting flow of operating fluid through said piston on the compression stroke, the piston being carried on a piston rod having a downwardly facing shoulder leading to a reduced diameter portion of said rod, the upper portion of said piston being provided with a central opening adapted to receive said rod above said shoulder, a relatively lower portion of said piston being provided below said upper portion with abutment means adapted to operatively engage said rod-shoulder to limit upward movement of said piston on said rod, said upper portion of said piston being relieved and provided with valve seat means in the same general plane as said abutment means, said valve seats opening to said passageway means, a flexible valve member carried between said rod-shoulder and said piston abutment means and having radially extending arm portions adapted to be received within the relieved portion of said piston and having valve-portions adapted to seat on said valve seat means to check flow of operating fluid through said passageway means, the extent of the relief of said piston being sufficient to shieldingly recess said valve member within the said upper piston portion to provide that said upper piston portion serves as a buffer means for engaging limit means carried by said cylinder at the end of the rebound stroke thereby protecting and shielding said valve member.

5. In a piston structure for reciprocal compression stroke and rebound stroke movement within a direct acting shock absorber cylinder, said piston being provided with passageway means in the piston opening to the head of said piston, a valve plate operatively secured to said piston and having generally radially extending arms terminating in valve-portions adapted to close said passageways, said piston being provided with projecting boss means between said arms to hold the arms against shifting from the passageways by turning of the plate and to shield said valve-plate and extending beyond said valve plate and adapted to abut stop means adjacent one end of the cylinder.

6. In a direct acting shock absorber piston structure, a piston rod having a reduced diameter end portion and provided with a shoulder facing toward said reduced diameter portion where the full diameter and reduced diameter join, a piston secured concentrically on said reduced diameter portion and having a central recess into which said shoulder engages, with radial groove-like recesses running out from said central recess to the outer periphery of the piston, the piston having passageways therethrough opening into said radial groove recesses, and a resilient valve disk clamped between said rod shoulder and the base of said central recess and having resilient valve arms extending into said groove recesses and controllingly overlying the openings from said passageways.

7. In a direct acting shock absorber piston structure, a piston rod having a reduced diameter end portion and provided with a shoulder facing toward said reduced diameter portion where the full diameter and reduced diameter join, a piston secured concentrically on said reduced diameter portion and having a central recess into which said shoulder engages, with radial groove-like recesses running out from said central recess to the outer periphery of the piston, the piston having passageways therethrough opening into said radial groove recesses, and a resilient valve disk clamped between said rod shoulder and the base of said central recess and having resilient valve arms extending into said groove recesses and controllingly overlying the openings from said passageways, said radial groove recesses being of widest dimension adjacent the outer periphery of the piston and said passageway openings being of substantially greater dimension in the circumferential direction than in the radial direction.

8. In a direct acting shock absorber piston structure, a piston rod having a reduced diameter end portion and provided with a shoulder facing toward said reduced diameter portion where the full diameter and reduced diameter join, a piston secured concentrically on said reduced diameter portion and having a central recess into which said shoulder engages, with radial groove-like recesses running out from said central recess to the outer periphery of the piston, the piston having passageways therethrough opening into said radial groove recesses, and a resilient valve disk clamped between said rod shoulder and the base of said central recess and having resilient valve arms extending into said groove recesses and controllingly overlying the openings from said passageways, said radial groove recesses being of widest dimension adjacent the outer periphery of the piston and said passageway openings being of substantially greater dimension in the circumferential direction than in the radial direction, said valve arms having at their distal end portions symmetrical ear portions overlying the passageway openings.

9. In a direct acting shock absorber piston structure, a piston rod having a reduced diameter end portion and provided with a shoulder facing toward said reduced diameter portion where the full diameter and reduced diameter join, a piston secured concentrically on said reduced diameter portion and having a central recess into which said shoulder engages, with radial groove-like recesses running out from said central recess to the outer periphery of the piston, the piston having passageways therethrough opening into said radial groove recesses, and a resilient valve disk clamped between said rod shoulder and the base of said central recess and having resilient valve arms extending into said groove recesses and controllingly overlying the openings from said passageways, said radial groove recesses being of widest dimension adjacent the outer periphery of the piston and said passageway openings being of substantially greater dimension in the circumferential direction than in the radial direction, said valve arms having at their distal end portions symmetrical ear portions overlying the passageway openings, said grooves having about the passageway openings raised narrow valve seats against which said valve arm ears abut.

10. In a piston structure of the character described, a piston having a face receptive flatwise thereagainst of a flexible disk valve provided with flexible valve arms radiating from a central body, said face having adjacent to the outer periphery of the piston, passageways with ports through the face of substantially greater dimensions circumferentially of the piston than in the radial direction and circumscribed by raised narrow valve seat lands or ridges with the area of the piston face on all sides of the valve seat ridges substantially recessed to facilitate fluid flow, and each of the valve seat ridges having extending generally radially inwardly therefrom supporting land or rib structure forming part of said piston face raised from said recessed portions and serving to support the resilient valve arms against buckling intermediate the portions of the arms engaging with the valve seats and the body of the valve disk.

References Cited in the file of this patent

UNITED STATES PATENTS

| | | |
|---|---|---|
| 1,634,949 | Le Valley | July 5, 1927 |
| 2,107,974 | Bechereau et al. | Feb. 8, 1938 |
| 2,467,098 | Rossman | Apr. 12, 1949 |